July 31, 1945.  W. KOENIG  2,380,766

REMOTE CONTROL PLANT

Filed Feb. 18, 1943

INVENTOR
Werner Koenig

ATTORNEY

Patented July 31, 1945

2,380,766

UNITED STATES PATENT OFFICE 2,380,766

REMOTE-CONTROL PLANT

Werner Koenig, Lucerne, Switzerland, assignor to Landis & Gyr, A. G., a corporation of Switzerland Application February 18, 1943, Serial No. 476,256
In Switzerland March 16, 1942

3 Claims. (Cl. 171—97)

Methods for the remote control of switches have already been proposed which consist essentially in momentarily energizing polarized switching relays with a positive or negative current impulse accordingly as the relay contact is to be opened or closed. In these methods it has been found particularly advantageous to use the power current network for the long distance control of, say, two-rate meters, water heaters or the like, as the network can be utilized as the lead line and the earth as the return line, or the neutral wire may be used for the lead line and the phase wire for the return line. This method, however, involves a disadvantage, inasmuch as only one double command (on and off or the like) can be transmitted. Where, on the other hand, it is intended to transmit a plurality of double commands, the likewise well known impulse selector method may be employed for this purpose. Reception sets operating on a selector method are, however, more expensive than the aforementioned polarized switching relays.

The present invention relates to an apparatus embodying a certain definite combination of the two known methods named, and is characterized and distinguished therefrom by the fact that, in connection with the impulse selector method, the execution of a double command is provided for by means of a positive and a negative impulse through the medium of the same transmission channel. Also in the fact that, in order to prevent interference in the polarized system by the impulses of the selector system, the selector impulses are preferably sent with that polarity which corresponds to the pretransmitted command of the polarized system.

The present invention provides a control system which is especially advantageous where a relatively big number of similar apparatus (two-rate meters, boilers or the like) have to be switched on or off at the same time and, in addition, if a number of smaller groups of appliances are to be independently controlled at different times. The large group of apparatus is then suitably controlled by positive and negative impulses through the medium of the cheap polarized switching relays, whereas the other specially controlled objects are controlled in any number and independently of one another and of those of the big group by the more expensive relays in connection with selectors. Thus the invention provides a system whereby the adaptability of a remote control plant to varying existing requirements is increased and the prime cost considerably reduced as compared with ordinary selector-controlled plants.

Figure 1:
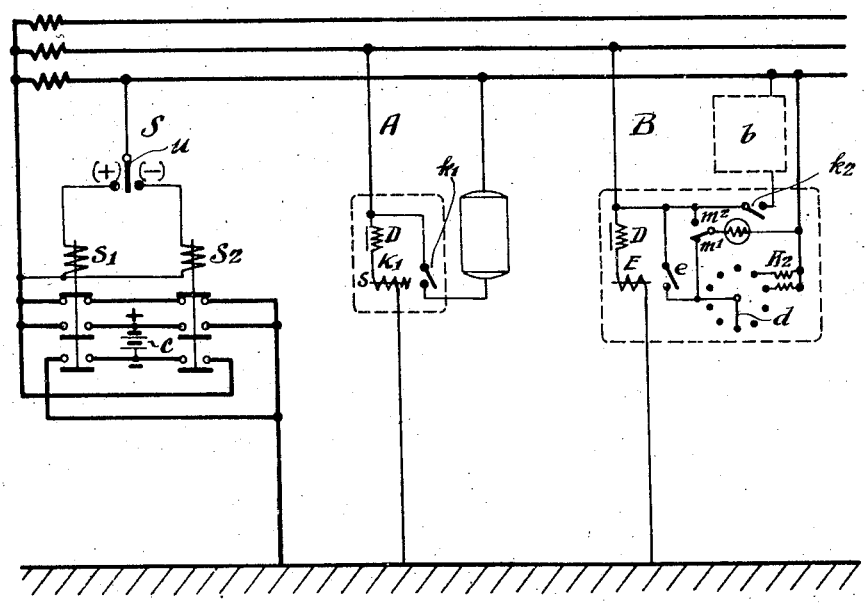
Figure 2:
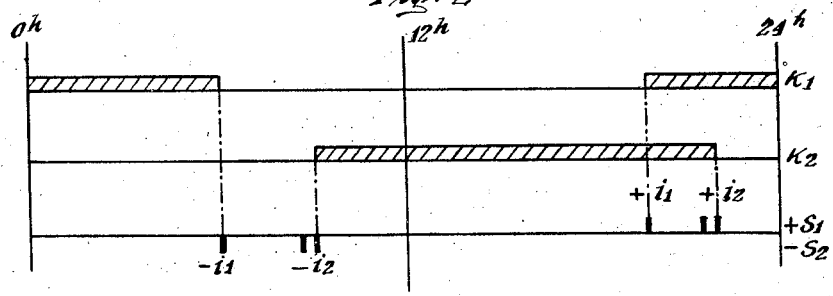

The accompanying drawing illustrates in Fig. 1 one form of embodiment of the invention, while Fig. 2 is a graph illustrative of the operation of the plant according to Fig. 1.

Referring to Fig. 1 which shows the application of the invention to a low-voltage A. C. network NW as a transmission channel, on the left side there is the sender or transmitter S with the change-over switch $u$, the relays $S_1$ and $S_2$, together with the D. C. source $c$ are capable of transmitting positive and negative impulses through use of the three pole switches S. In the center is a receiver A consisting of a polarized switching relay A' for use in connection with the operation of a water heater $a$. B represents a selector reception apparatus which operates on the impulse interval method. The wiring both of the sender and of the two receivers A, B is easily understood from Fig. 1.

The graph of Fig. 2 shows the switch-on-and-off cycle of the two controlled objects $a$, $b$ or their operating contacts $k_1$ and $k_2$, whereby the pertinent impulse control actions are explained.

The control impulses are transmitted by means of the switch contacts $t_1$, $t_2$ at the sender S either by hand operation of switch $u$ or automatically by a time-switch, impulse element or the like. If the switch $u$ is thrown to the left to $t_1$, a positive impulse is impressed on the network, as the relay $S_1$ attracts its armature, whereby the positive pole of the battery $c$ is connected with the network and the negative pole with the earth. If the switch $u$, for transmitting a negative impulse, is shifted to the right to $t_2$, the relay $S_2$ attracts its armature and connects the negative pole of the battery $c$ with the network, while the positive pole is earthed. The switch $u$ is used both for transmitting the impulse for the control of receiver A and for transmitting the impulse couple (pair) for the control of receiver B. For both transfers the same network is utilized as a transmission channel. The polarized reversible switch $k_1$ of the receiver A connects in the water heater at the incidence of a positive impulse and disconnects it when there is a negative one. The selector B' of the receiving apparatus B starts upon arrival of the first impulse of an impulse couple and gives the lead, that is, carries out the command upon occurrence of the second impulse of the impulse couple. The selection of the command for connection of element $b$ of some other element is dependent on the time interval of the two impulses. In this way the contact $k_2$ of the relay $K_2$ can be switched on and—without a dissimilar impulse interval—switched off to operate element $b$. Other elements similar to $b$ may be operated from other windings similar to $K_2$, responsive to different impulses.

From the graph according to Fig. 2 it may be gathered that the impule $-i_1$ opens the switch $k_1$ of receiver A, thereby disconnecting the water heater $a$. Subsequently the impulse couple $-i_2$ is transmitted, whereby in receiver B the contact $k_2$ is closed and hence the controlled object $b$ switched on. Then with a renewed impulse $-i_1$ the contact $k_1$ is closed and, consequently, the water heater $a$ connected up again whereupon the impulse $+i_2$ causes the controlled object $b$ to be cut out by opening the switch $k_2$.

Due to the feature that the selector impulses controlling receiver B are sent with that polarity which corresponds to the last command transmitted of the polarized system for receiver A, selector impulses which have the same polarity as the last impulse that has occurred do not affect the polarized reception appliances $a$. Conversely, an impulse intended for the polarized reception apparatus A cannot bring about a switching on of the selector reception sets B. The neutral relay E, it is true, responds to all impulses of any polarity; however, as only one single impulse is transmitted for actuating the polarized reception relay contact $k'$, it only occasions in the selector reception set B the start of the selector motor M over $m_1$. The cammed switch member $m$ coacting with change-over contact $m_1-m_2$ then switches on position $m_2$ and keeps the motor M alive, whereby the contact arm $d$ of the selector after completion of the revolution resumes its rest position, where the change-over contact $m$ switches back to position $m_1$. As no further impulse occurs during this free revolution of arm $d$, no switching of $k_2$ is performed on the selector reception set B.

The control of selector reception sets B over the same transmission channel insures not only an avoidance of interference with the polarized reception relays; but, on the contrary, an increase in reliability of operation. If, for instance, owing to a temporary interruption of current in the mains due to installation work, a polarized reception relay or a group of such does not receive a switching impulse, these relays take up a false position and maintain it even when the line has subsequently again been switched on. Thereafter when a selector impulse couple arrives all the false positioned polarized relays will be properly reset again. By the parallel working of the two systems in the manner indicated false switch positions of the polarized relays due to temporary current interruptions in the mains are not so liable to occur and generally endure for a shorter time than with the use of an ordinary polarized arrangement.

Having thus described my invention, I claim:

1. In a remote control system, the combination of a transmitter having means for transmitting current impulses of two different polarities, a receiver having means energized by said transmitted current impulses of the one polarity and deenergized by said transmitted current impulses of the other polarity, and a second receiver having means energized and deenergized with the first named means and having a selector device set for action by the energization of the second named means by the current of either polarity and thereafter selectively operative by a plurality of current impulses of either polarity.

2. In a remote control system, the combination of a transmitter having means for transmitting impulses of two different polarities, a receiver having a two-way switch system operating in one or the other way depending upon the polarity of the transmitted impulse, and a selector receiving device having its selecting mechanism switched into operative position by the polarized impulse transmitted to said receiver respective of the polarity thereof, for receiving an operating impulse couple from said transmitter.

3. In a remote control system, the combination of a receiver having pole changing relays operated by a polarized impulse to perform one or the other of two switching functions, a second receiver having non-polarized relays operated by impulse of either polarity to place a selector in position for selecting one of a plurality of switching positions, and transmitting means for transmitting a polarized impulse of one or another polarity simultaneously to said two receivers to simultaneously operate said first receiver and place the second receiver in selective operating position, and to thereafter transmit an impulse couple to said second receiver to select the desired switching position and operate the switching function thereby.

WERNER KOENIG.